United States Patent
Glimpel et al.

(10) Patent No.: US 7,467,577 B2
(45) Date of Patent: Dec. 23, 2008

(54) METHOD AND TOOL OR TOOL SET FOR PRODUCING A THREAD IN AT LEAST TWO WORKING STEPS

(75) Inventors: Helmut Glimpel, Lauf (DE); Dietmar Hechtle, Pegnitz (DE)

(73) Assignee: Emuge-Werk Richard Glimpel GmbH & Co. KG Fabrik für Päzisionswerkzeuge, Lauf (DE)

( * ) Notice: Subject to any disclaimer, the term of this patent is extended or adjusted under 35 U.S.C. 154(b) by 51 days.

(21) Appl. No.: 11/761,607

(22) Filed: Jun. 12, 2007

(65) Prior Publication Data

US 2007/0286694 A1 Dec. 13, 2007

(30) Foreign Application Priority Data

Jun. 13, 2006 (DE) .............................. 10 2006 027

(51) Int. Cl.
*B23B 1/00* (2006.01)
*B23G 1/00* (2006.01)

(52) U.S. Cl. ........................................ 82/1.11; 82/110
(58) Field of Classification Search .................. 409/66, 409/69; 33/199 R; 82/113, 1.11, 47, 118, 82/110; 470/1, 10, 57; 76/101.1
See application file for complete search history.

(56) References Cited

U.S. PATENT DOCUMENTS

| | | | | | |
|---|---|---|---|---|---|
| 2,668,401 | A | * | 2/1954 | Reimschissel | 451/48 |
| 3,496,582 | A | * | 2/1970 | Johnson | 470/19 |
| 4,761,891 | A | * | 8/1988 | Sugimura | 33/503 |
| 5,112,169 | A | * | 5/1992 | Ryoki et al. | 409/66 |
| 5,144,871 | A | * | 9/1992 | Niwa | 82/1.11 |
| 5,221,234 | A | * | 6/1993 | Pakos | 470/10 |
| 5,285,706 | A | * | 2/1994 | Robinson | 82/113 |
| 5,626,064 | A | * | 5/1997 | Gradel et al. | 82/110 |
| 6,155,148 | A | * | 12/2000 | Shinozaki et al. | 82/1.11 |
| 6,460,435 | B1 | * | 10/2002 | Meyer et al. | 82/1.11 |
| 6,487,946 | B1 | * | 12/2002 | Schroder | 82/110 |

* cited by examiner

*Primary Examiner*—Willmon Fridie

(57) ABSTRACT

A method for producing a thread in a workpiece can include producing a preliminary thread by removing material from the workpiece (e.g., with a cutting action), which produces a preliminary thread profile having two preliminary thread flanks and a preliminary thread root connecting the two preliminary thread flanks. The method can also include producing, in at least one second working step, a final thread having a final thread profile, which has two final thread flanks and a final thread root connecting the two final thread flanks. The final thread can be produced by plastic pressing-in of the material of the workpiece at least in a section of the preliminary thread profile by a predetermined volume. In one implementation, at least one of the preliminary thread flanks and at least one of the of the thread-forming profile are include at different inclination angles from each other.

19 Claims, 11 Drawing Sheets

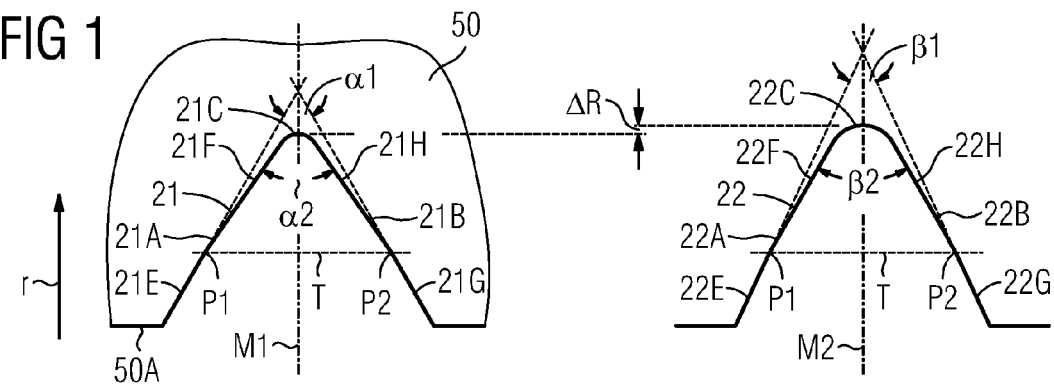
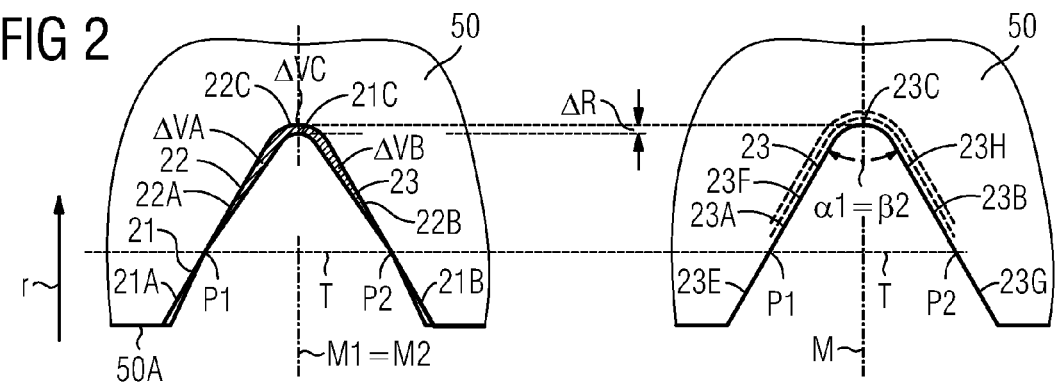
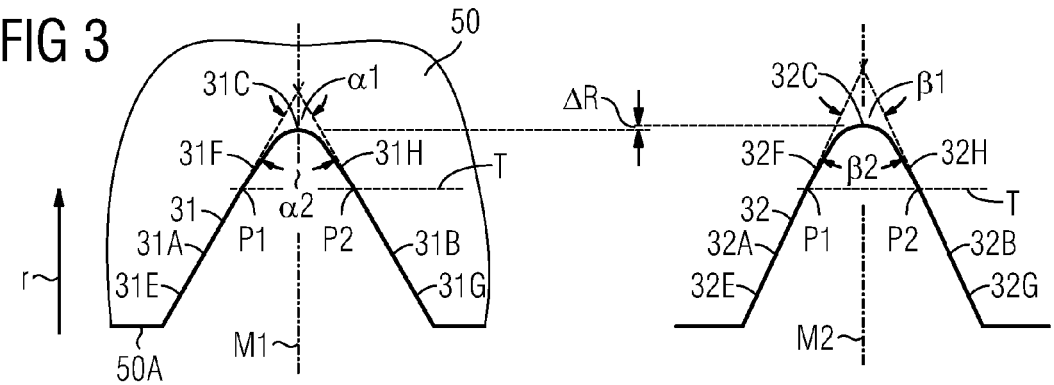
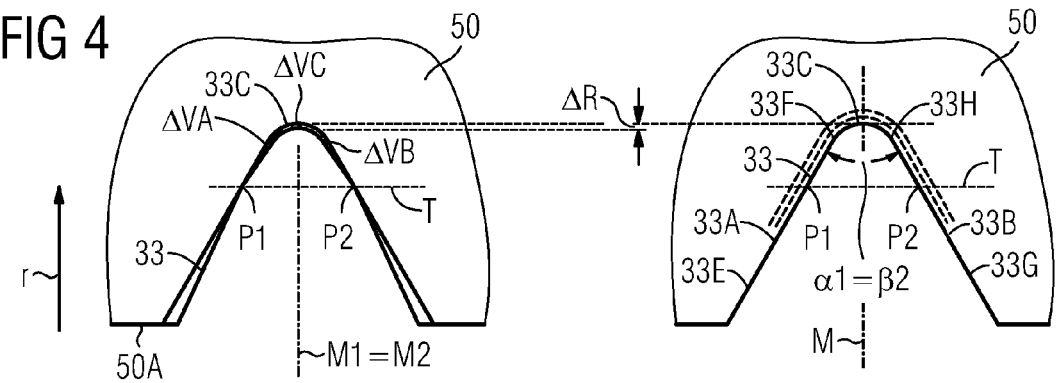

FIG 32
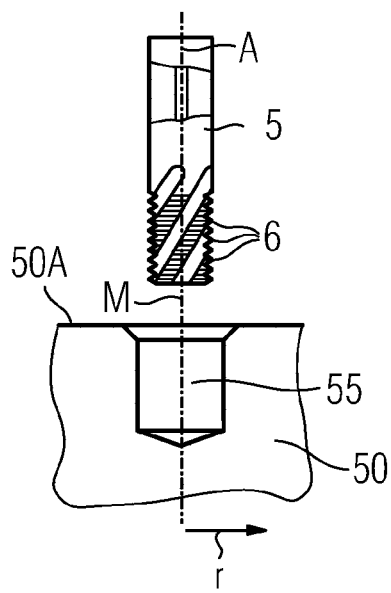
FIG 33
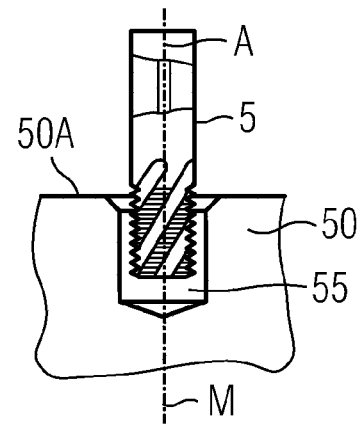
FIG 34
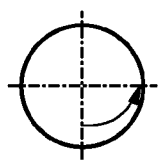
FIG 35
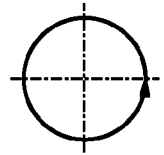
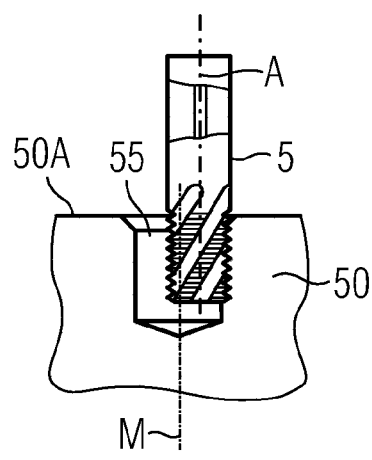
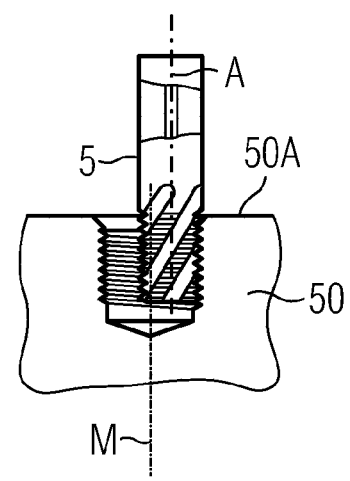

ically cutting, exclusively chipless and both cutting and chipless methods and threading tools are known. Cutting thread production is based on the removal of the material of the workpiece in the region of the thread turn (or, thread profile). Chipless thread production is based on production of the thread turn in the workpiece by pressure and the forming or plastic deformation, effected as a result, of the workpiece.
METHOD AND TOOL OR TOOL SET FOR PRODUCING A THREAD IN AT LEAST TWO WORKING STEPS

CROSS-REFERENCE TO RELATED APPLICATIONS

The present invention claims the benefit of priority under 35 U.S.C. § 119 to German Patent Application No. 10 2006 027 611.6, filed on Jun. 13, 2006, having a translated title of "Method and tool or tool set for producing a thread in at least two working steps," the entire contents of which are incorporated herein.

BACKGROUND OF THE INVENTION

1. The Field of the Invention

The invention relates to a method and a tool or a tool set in each case for producing a thread in at least two working steps.

2. Background and Relevant Art

For thread production or thread rework, exclusively cutting, exclusively chipless and both cutting and chipless methods and threading tools are known. Cutting thread production is based on the removal of the material of the workpiece in the region of the thread turn (or, thread profile). Chipless thread production is based on production of the thread turn in the workpiece by pressure and the forming or plastic deformation, effected as a result, of the workpiece.

An advantage of the chipless thread production compared with the cutting thread production is that, due to the consolidation or compaction at the surface, the hardness of the material in the region of the thread profile increases and thus a more wear-resistant thread can be produced. Coming within the scope of cutting thread production are taps (cf. Handbuch der Gewindetechnik und Frästechnik [Manual of threading practice and milling practice], publisher: EMUGE-FRANKEN, publishing firm: Publicis Corporate Publishing, year of publication: 2004 (ISBN 3-89578-232-7), designated below only as "EMUGE manual", chapter 8, pages 181 to 298) and thread milling cutters (cf. EMUGE manual, chapter 10, pages 325 to 372).

A tap is a thread-cutting tool which works axially relative to its tool axis and whose cutting edges are arranged along an external thread having the thread pitch of the thread to be produced. During the production of a thread, the tap is moved with an axial feed and while rotating about its tool axis into a hole of the workpiece at a rotary speed dependent on the feed rate, its cutting edges being permanently in engagement (continuous cut) with the workpiece at the wall of the hole.

In the thread milling cutter, a plurality of milling teeth having milling cutting edges are arranged offset along the tool circumference and/or axially relative to the tool axis. To produce the thread, the thread milling cutter is rotated about its own tool axis and is moved with its tool axis in a linear feed movement on the one hand and additionally in a circular movement about a center axis of the thread to be produced or of the pilot hole in the workpiece on the other hand, as a result of which a helical movement of the tool is obtained, the pitch of which corresponds to the thread pitch of the thread to be produced. The milling cutting edges of the thread milling cutter engage intermittently one after the other in the workpiece (interrupted cut).

Coming within the scope of chipless thread production tools are "thread formers" (cf. EMUGE manual, chapter 9, pages 299 to 324) and "circular thread formers".

On a tool shank, thread formers have an outer profile which encircles the tool axis spirally or helically with the pitch of the thread to be produced and has an approximately polygonal cross section. The generally rounded-off polygon corner regions form pressing lobes or forming teeth or forming wedges which press the thread into the material by plastic deformation and flow of the workpiece material into the spaces between the outer profile on the one hand and compaction of the workpiece material on the other hand. To produce an internal thread in an already existing hole, the thread former is inserted into the hole with a linear feed movement axially relative to the tool axis and with the tool rotating about this tool axis. Known exemplary embodiments of such (axial) thread formers are also found in DE 101 36 293 A1, DE 199 58 827 A1 or also in DE 39 34 621 C2.

WO 02/094491 A1 discloses a circular thread former and a circular forming method for chipless thread production. This known circular thread former is elongated and comprises a working region with one or more annular circumferential profiles separated from one another by annular grooves and having a least three respective pressing lobes like a polygon. This tool is inserted into a hole having a larger diameter than the tool and performs, in addition to a rotation about its own tool axis, a circular movement along the circumference of the hole and at the same time a linear feed movement into the hole, thereby forming the thread in the hole in a helical movement and in a chipless manner. A further circular former and a further circular forming method are known from DE 103 18 203 A1.

Finally, combined methods having at least two working steps for producing internal threads are known, in which, in a first working step, a preliminary thread is produced and, in a further working step, the internal thread is completed by forming from the preliminary thread. Due to this two- or multi-stage method, the entire volume of the thread profile does not have to be produced by a single forming tool by plastic deformation of the material, and the loading and the wear of the forming tool are reduced. Advantages in the case of coarse thread pitches, materials that flow poorly, the consolidation of thread regions and the smoothing of thread surfaces can be achieved by the combination of cutting and forming production steps.

For such a combined method having a plurality of working steps, a separate tool can be used in a first variant in each working step. DE 10 2004 033 772 A1 discloses such a method, in which, in a first working step, a preliminary thread is initially produced in the workpiece with a cutting or chipless action by means of a tap, thread milling cutter, by turning, grinding or winding or also by means of a thread former and, in a second working step, the finish production of the preliminary thread is effected with a chipless action using a thread former or circular former, the forming wedges of which press into the thread root of the preliminary thread. The forming wedges are in this case centered by widened portions of their flanks in the initially produced thread.

The thread flanks of the preliminary thread produced in the first working step remain unchanged in the second working step, since the widened portions of the forming wedge flanks bear only against the preliminary thread flanks for centering, but do not deform the latter. In the second working step, the workpiece material is deformed further only in the region of the thread root, connecting the two thread flanks, of the preliminary thread. As a result, in the second working step, the entire thread root and also those regions of the thread flanks of the final thread which directly adjoin the thread root and lie in extension of the thread flanks of the preliminary thread are completed by forming and are thus additionally compacted and consolidated, whereas the predominant region of the thread flanks of the final thread have already been completely produced in the first working step and have not been worked further in the second working step.

In a second known variant of a combined method having a plurality of working steps, a combination tool having a cutting tapping part and a chipless thread-forming part, offset axially to the tool axis relative to the tapping part, on a tool shank is used, the tapping part, with rotation about the tool axis and with axial feed, cutting a preliminary thread in the workpiece in a first working step, and the following thread-forming part forming the preliminary thread in a predetermined manner in a second working step in order to produce the final thread. The tap therefore initially cuts the thread and the thread former subsequently partly forms the initially cut thread. Such an axial combination tool and method are known from DE 70 17 590 U and DE 196 49 190 C2.

According to DE 196 49 190 C2 the thread is first of all produced with a precise profile and accurately to size in the thread flanks by a cutting action by means of the tap of the combination tool and then only the thread root of this initially cut thread is compacted with a chipless action to a predetermined final diameter by the directly following thread former. As a result, in particular the first thread turns, following an initial thread cut, can be produced in such a way that they are more resistant to vibrations and are less susceptible to fracture. In the second working step, the two thread flanks cut by the tap in the first working step remain completely unchanged. The workpiece material at the thread root is not made to flow, but is first cut and then only compacted.

DE 70 17 590 U1 discloses a combination tool for producing internal threads, having a tapping drill, designed as a taper or second tap, as a front tool part for the initial cutting of the thread and a thread former, adjoining in the working direction, as a rear tool part for the finishing of the thread.

BRIEF SUMMARY OF THE INVENTION

Implementations of the present invention include methods and apparatus/devices for producing a thread in at least two working steps.

For example, one implementation of a method for producing a thread in a workpiece can involve producing a preliminary thread to create a preliminary thread profile having two preliminary thread flanks and a preliminary thread root connecting the two preliminary thread flanks. The preliminary thread profile can be created in the workpiece by removing material from the workpiece (or, by cutting) in at least one first working step (or, process step). In addition, the method can involve producing a final thread having a final thread profile which generally has two final thread flanks and a final thread root connecting the two final thread flanks. The final thread profile can be created by plastic pressing-in (or, chipless forming) of the material of the workpiece at least in a section of the preliminary thread profile by a predetermined or predeterminable pressing-in volume.

The plastic pressing-in can be accomplished using at least one thread-forming profile which has two flanks and a root region connecting the two flanks. In addition, at least one of the preliminary thread flanks can be inclined, at least in a flank section, at a first inclination angle (or, angle of slope) to a center axis (or, a reference axis running through the profile) of the preliminary thread profile. Furthermore, at least one of the flanks of the thread-forming profile can be inclined, at least in a flank section, at a second inclination angle to a center axis of the thread-forming profile. In at least one implementation, the first inclination angle and the second inclination angle are different from one another.

First of all, a preliminary thread is therefore produced in the workpiece with a cutting action or by material removal in at least one first working step, and then, in at least one second working step, the preliminary thread is reworked without material removal, only by plastic pressing-in of a thread-forming tool and by the permanent deformation, effected as a result, of the workpiece material and is formed further into the final thread. In other words, during the plastic pressing-in for producing the final thread in the second working step, such a high pressure is exerted on the workpiece surface by means of the tool that, beyond purely elastic deformation, specific plastic forming of the workpiece material in the thread region is obtained, this plastic forming in turn leading to an increase in volume in the final thread profile relative to the preliminary thread profile.

The plastic pressing-in or forming consolidates the structure in the workpiece material at the relevant thread profile regions and as a rule also effects a flow of the workpiece material if the pressure exerted is above the yield point of the workpiece material. Both the consolidation processes and the flow processes lead on their own or in combination to the desired reduction in volume of the workpiece material and to the complementary increase in volume of the thread profile.

The invention, then, is based at least on part on the idea of matching the preliminary thread profile and the thread-forming profile to one another in such a way that, at least in sections, the thread flanks of the preliminary thread have a different angle of slope or inclination angle from the thread flanks of the thread-forming profile for reforming the preliminary thread.

The pressing-in volume is in this case preferably established by adapting a thread-forming profile or an effective profile of the thread-forming tool to the preliminary thread profile produced beforehand and results in particular as a differential volume of the respective dimensions of preliminary thread profile and thread-forming profile less a possible and as a rule relatively small restoring volume on account of elastic restoring of the workpiece material.

A thread profile, whether the preliminary thread profile, the thread-forming profile or the final thread profile, is in this case defined in the conventional manner as a contour of a cross section of the thread turn perpendicularly to its spiral or helical course or as a contour of a longitudinal section through the thread turn in a sectional plane containing the thread center axis.

The final thread flanks of the final thread profile therefore extend, at least in sections, further into the workpiece material than the preliminary thread profile beforehand, or the final thread profile, at least in a section of the thread flanks, is larger than the preliminary thread profile by the volume displaced during the forming.

The preliminary thread profile and/or the thread-forming profile can be produced or constituted by a single profile or also by superimposition of a plurality of individual profiles as a resulting effective profile.

In one implementation, the tool or the tool set for producing threads in workpieces can include at least one thread-cutting region having a thread-cutting profile for producing a preliminary thread whose preliminary thread profile has two preliminary thread flanks and a preliminary thread root connecting the two preliminary thread flanks; and at least one chipless thread-forming region having a thread-forming profile, which has two flanks and a thread root region connecting the two flanks, for reforming the preliminary thread by plastic pressing-in of the material of the workpiece at least in a section of the preliminary thread flanks by a predetermined or predeterminable pressing-in volume. In general, the thread-cutting region(s) and the thread-forming region(s) each being formed on an associated tool or on a common tool; at least one of the preliminary thread flanks being inclined, at least in a flank section, at a first inclination angle to the center axis, and at least one of the flanks of the thread-forming profile being inclined, at least in a flank section, at a second inclination angle to a center axis; and the first inclination angle and the second inclination angle being different from one another.

Furthermore, the production of the preliminary thread profile and the further forming of the preliminary thread profile into the final thread profile in the two working steps may be effected with different tools or also with a joint combination tool.

The tool or tools or the tool region or tool regions for producing the preliminary thread profile in the first working step may in particular comprise a tap and/or a thread milling cutter, and the tool or tools or the tool region or tool regions for finish forming the final thread in the second working step may comprise a thread-former and/or a circular thread-former.

To insert the following thread-forming region into position, said thread-forming region may have an insertion region or an insertion thread having a profile adapted to the preliminary thread profile, and/or smooth compensation for compression or minus programming with compensation for tension may be provided in the tool clamping means.

Furthermore, a defined thread start of the preliminary thread in the workpiece or exact insertion of the following thread-forming region at this thread start can be produced by determining the rotary position of the tool(s).

Due to this combination of cutting or forming production steps. In particular, threads can also be produced by forming in materials that flow poorly or are difficult to form, such as gray cast iron for example (partly or in final processing); the process forces can be reduced; threads having large thread pitches, in particular 6 mm, and/or large processing cross sections (in the final processing) can be produced by forming; a "claw formation", despite the forming final processing, can be avoided or reduced and thus the nut core or the core diameter can be kept within close tolerances, consolidation and increase in the fatigue strength and dynamic strength of the thread, at least of its finally formed thread regions, can be achieved; and smoothing of thread surfaces, at least at the formed flank regions, can be achieved.

Advantageous configurations and developments according to the invention are described herein throughout the description and claims.

With the method and the tool(s) according to the invention, all common thread types, including metric threads (e.g., according to DIN or ISO), pipe threads, US UNIFIED threads, MJ threads, US UNJ threads, tapered threads, cylindrical threads, trapezoidal threads, round threads, buttress threads, WHITWORTH threads and also special threads such as re-circulating ball screw threads or self-locking threads, can be produced in two or more stages.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 shows a first embodiment of a cut preliminary thread profile and of a thread-reforming profile;

FIG. 2 shows the superimposition of the two thread profiles according to FIG. 1 and the final thread profile resulting therefrom;

FIG. 3 shows a second embodiment of a cut preliminary thread profile and of a thread-reforming profile;

FIG. 4 shows the superimposition of the two profiles according to FIG. 3 and the final thread profile resulting therefrom;

FIGS. 32 to 37 show various instantaneous depictions of a working process for producing a preliminary thread using a circular thread milling cutter.

DETAILED DESCRIPTION OF THE PREFERRED EMBODIMENTS

Figure 5:
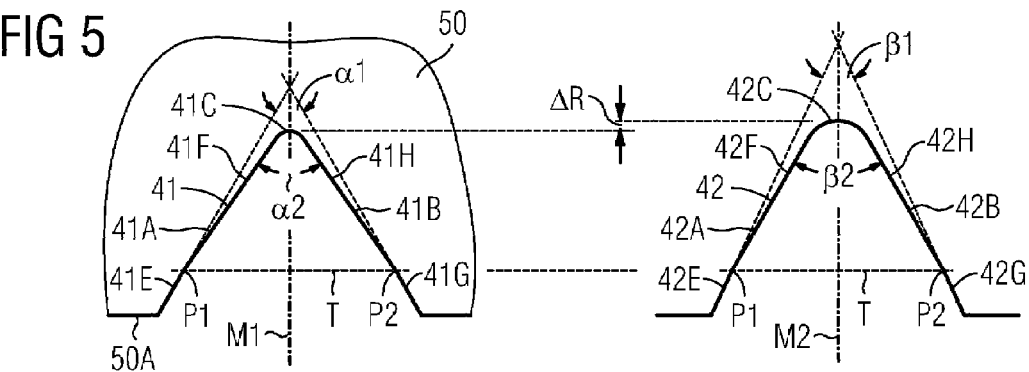
FIG. 5 shows a third embodiment of a cut preliminary thread profile and of a thread-reforming profile.

In the exemplary embodiment according to FIGS. 1 and 2, the preliminary thread profile 21 cut in the first working step of the method is an internal thread on a surface 50A of the workpiece 50, which is the inner surface of a hole. Both thread flanks 21A and 21B of the preliminary thread profile 21 are subdivided into two linear flank sections 21E and 21F and respectively 21G and 21H having a different slope by a separating plane which is shown by a broken line and runs parallel to the surface 50A of the workpiece 50 and whose intersection with the flank 21A is designated by P1 and whose intersection with the flank 21B is designated by P2.

The outer flank sections 21E and 21G of the thread flanks 21A and 21B, which run from the surface 50A of the workpiece 50 up to the respective transition points P1 and P2, are directed toward one another at an opening angle α1 or enclose this angle α1, whereas the adjoining, inner flank sections 21F and 21H, running from the transition points P1 and P2, respectively, to the thread root 21C, of the thread flanks 21A and 21B are directed toward one another at a larger angle α2, i.e., α2>α1. The outer flank section 21E and 21G encloses an angle 180°−(α1+α2)/2 with the associated inner flank section 21F and 21H at the transition point P1 and P2, respectively, and, on account of the separating plane lying relatively far on the outside, is designed to be shorter than the inner flank section 21F or 21H, respectively. The preliminary thread profile 21 has a center axis M1 and is designed in FIG. 1 to be symmetrical with respect to this center axis M1. The thread root 21C is designed to be rounded off, in particular in a circular manner.

An associated thread-forming profile 22 for the forming rework of the preliminary thread profile 21 is shown on the right-hand side of FIG. 1. At the thread-forming profile 22, too, the flanks 22A and 22B are subdivided into two linear flank sections 22E and 22F and respectively 22G and 22H at the transition points P1 and P2 defined by the same separating line T or the separating line T arranged at the same radius r, the outer flank sections 22E and 22G enclosing the angle β1 and the inner flank sections 22F and 22H enclosing the angle β2, and β2>β1. The outer flank section 22E and 22G encloses an angle 180°−(β1+β2)/2 with the associated inner flank section 22F and 22H at the transition point P1 and P2, respectively. The thread-forming profile 22 has a center axis M2 and is designed in FIG. 1 to be symmetrical with respect to this center axis M2.

The thread root region 22C of the thread-forming profile 22 is rounded off and is larger in its length (or, width in cross section) than the thread root 21C of the preliminary thread profile 21. In the tool, the thread root region 22C is the outer region lying radially furthest on the outside or the superimposition of the tooth tips of the forming teeth; and in the complementary profile formed in the workpiece, said thread root region is the thread root or the deepest region in the workpiece. The thread root region 22C of the thread-forming profile 22 is now arranged further outward radially, i.e., in the direction of the radius r, by a radial difference or a radial distance ΔR or has a corresponding larger radial infeed into the workpiece than the preliminary thread profile 21.

The superimposition of the two profiles 21 and 22 in the successive method steps, that is to say first of all cutting production of the preliminary thread profile 21 and after that forming rework of the preliminary thread profile 21 by the thread-forming profile 22, is shown on the left-hand side of FIG. 2 and the resulting final thread profile 23 is shown on the right-hand side of FIG. 2. The opening angle α1 of the outer flank sections 21E and 21G of the preliminary thread profile 21 is larger than the opening angle β1 of the outer flank sections 22E and 22G of the thread-forming profile 22, i.e., α1>β1, and the opening angle α2 of the inner flank sections 21F and 21H of the preliminary thread profile 21 is larger than the opening angle β2 of the inner flank sections 22F and 22H of the thread-forming profile 22, i.e., α2>β2. The center axes M1 and M2 of the two superimposed profiles 21 and 22 are made congruent or are brought into line and the resulting center axis of the final thread profile 23 is designated by M and coincides in FIG. 2 with the center axes M1 and M2. As a result, the final thread profile 23 is also symmetrical with respect to its center axis M.

Due to cold working and flow of the material and due to consolidation, a respective volume difference or a pressing-in volume ΔVA and ΔVB is incorporated further into the workpiece 50 at the two flanks by the thread-forming profile 22. The pressing-in volume ΔVA at the flank 21A and ΔVB at the flank 21B of the preliminary thread profile 21 lies between the inner flank sections 21F and 21H of the preliminary thread profile 21 on the one hand and 22F and 22H of the thread-forming profile 22 on the other hand and additionally between the transition points P1 and P2 on the one hand and the thread root 21C on the other hand and increases between the points P1 and P2 and the thread root 21C or 23C of the final thread 23 toward the thread root 21C or 23C in accordance with the inclination difference α2−β2 of the inner flank sections. The radial distance ΔR of thread root 21C and thread root region 22C is selected in such a way that the pressing-in volume ΔVC pressed-in at the thread root 21C of the preliminary thread 21 is adapted, with respect to the engagement length of the profile, to the adjoining pressing-in volume ΔVA and ΔVB at the flanks 21A and 21B.

The thread root 23C and the adjacent inner flank sections 23F and 23H of the final thread profile 23 are therefore produced by forming, wherein, on account of the pressing-in volume increasing toward the thread root 23C, the compaction is greatest at the thread root 23C itself, indicated by the double dotted line, which represents greater consolidation (more lines mean more consolidation).

In the exemplary embodiment according to FIG. 3 and FIG. 4, the separating line T shown by broken line and having the two transition or intersection points P1 and P2 is shifted further inward toward the thread root compared with the exemplary embodiment according to FIGS. 1 and 2. As a result, the two inner flank sections 31F of the flank 31A and 31H of the flank 31B of the preliminary thread profile 31 and accordingly the two inner flank sections 32F of the flank 32A and 32H of the flank 32B of the thread-forming profile 32 are shorter than the corresponding outer flank sections 31E and 31G of the preliminary thread profile 31 and respectively 32E and 32G of the thread-forming profile 32. In addition, the radial distance ΔR between the thread root regions 31C and 32C of the profiles 31 and 32 is selected to be smaller than in FIGS. 1 and 2.

Therefore, between the points P1 and P2 and the thread root 33C of the final thread 33, a pressing-volume ΔVA increasing toward the thread root 33C is obtained at the flank 33A and a pressing-in volume ΔVB increasing toward the thread root 33C is obtained at the flank 33B, and in addition a pressing-in volume ΔVC corresponding to the radial distance ΔR is obtained at the thread root 33C itself. The thread root 33C and the adjacent flank sections 33F and 33H of the final thread profile 33 are therefore produced by forming. On account of the pressing-in volume increasing toward the thread root 33C, the consolidation is greatest at the thread root 33C itself, indicated by the double dotted line. In FIGS. 3 and 4, too, α2>β2 and α1>β1 and the profiles 31, 32 and 33 are designed to be symmetrical with respect to their respective center axes M1, M2 and M, which again coincide.

Figure 6:
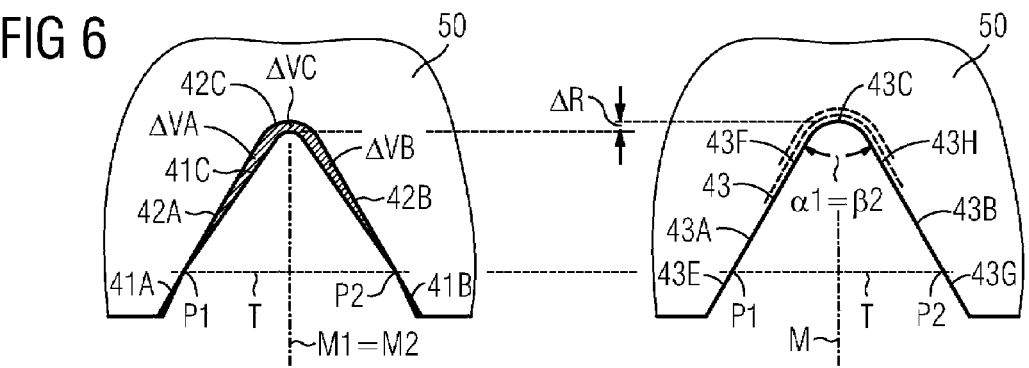
FIG. 6 shows the superimposition of the two profiles according to FIG. 5 and the final thread profile resulting therefrom.

In the exemplary embodiment according to FIG. 5 and FIG. 6, the separating line T is placed further outward compared with FIGS. 1 to 4, and, on account of the transition points P1 and P2, lying further on the outside as a result, between the flank sections 41E and 41F and 41G and 41H at the preliminary thread profile 41 and 42E and 42F and 42G and 42H at the thread-forming profile 42, larger pressing-in volumes ΔVA and ΔVB are obtained at the flanks 41A and 41B of the preliminary thread profile 41.

The radial distance ΔR and thus the volume ΔVC pressed-in at the thread root 41C of the preliminary thread 41 are again adapted, with respect to the engagement length of the profile, to the adjoining pressing-in volumes ΔVA and ΔVB at the flanks 41A and 41B. The pressing-in volumes ΔVA and ΔVB again increase inward toward the thread root 43C of the final thread 43, to be precise to a greater extent than in FIGS. 1 to 4, thereby resulting in especially high consolidation of the material structure of the workpiece in particular in the bottom innermost region of the flank sections 43F and 43H of the flanks 43A and 43B of the final thread 43, this consolidation again being indicated by the broken lines, of which there are now three, in the workpiece 50.

Figure 7:
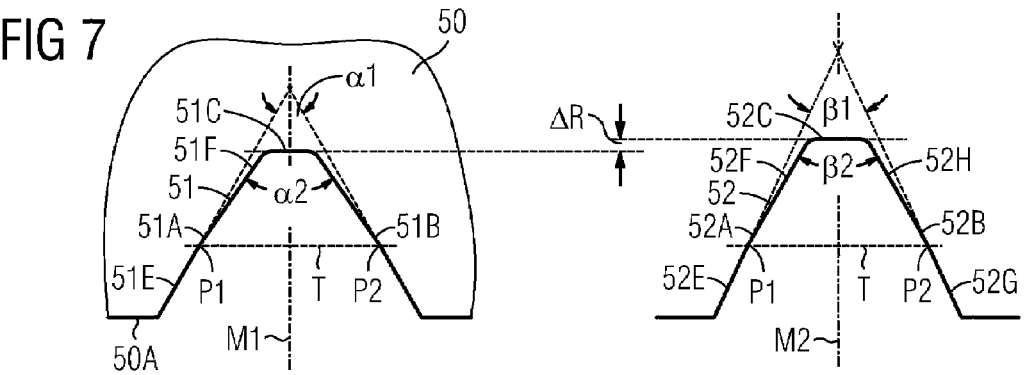
FIG. 7 shows a fourth embodiment of a cut preliminary thread profile and of a thread-reforming profile.
Figure 8:
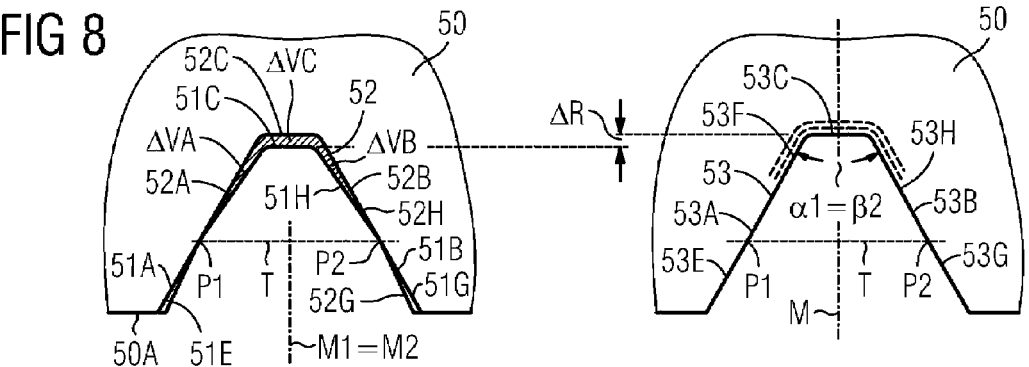
FIG. 8 shows the superimposition of the two profiles according to FIG. 7 and the final thread profile resulting therefrom.

Shown in FIGS. 7 and 8 is a further exemplary embodiment having two flank sections 51E and 51F, inclined differently relative to one another, of the flank 51A of the preliminary thread profile 51 and two flank sections 51G and 51H, inclined differently relative to one another, of the flank 51B of the preliminary thread profile 51. According to FIG. 7 and FIG. 8, the thread root regions 51C of the preliminary thread profile 51 and 52C of the thread-forming profile 52 are each flattened and therefore run parallel to the workpiece surface 50A and merge with a slight radius or an in particular circular curvature into the respective adjoining flanks 51A and 51B and 52A and 52B.

According to FIG. 8, the superimposition of the two profiles, namely of the preliminary thread profile 51 and of the thread-forming profile 52, produces a trapezoidal final thread profile 53 having linear thread flanks 53A and 53B, which are directed toward one another at the angle β2=α1 and are connected to one another by a straight thread root 53C via rounded transition regions.

On account of the selected radial distance ΔR and the lateral dimensions at the thread flanks 51A and 51B and 52A and 52B and their opening angles α1 and α2 and β1 and β2 for the flank sections 51E to 51H and 52E to 52H, the pressing-in volume ΔVA, shown on the left in FIG. 8, between the flank sections 51F and 52F and the pressing-in volume ΔVB between the flank sections 51H and 52H and the thread-root-side pressing-in volume ΔVC between the thread roots 51C and 52C are obtained. The pressing-in volumes again increase from outside to inside, thereby resulting in increasing consolidation at the thread root 53C of the final thread 53. The exclusively formed inner flank sections of the final thread profile 53 are designated at the flank 53A by 53F and at the flank 53B by 53H, and the exclusively cut outer flank section of the flank 53A is designated by 53E and the exclusively cut outer flank section of the flank 53B is designated by 53G.

In all the exemplary embodiments according to FIG. 1 to FIG. 8, it is then preferably the case that α1=β2, such that the exclusively cut outer flank sections 23E and 23G or 33E and 33G or 43E and 43G or 53E and 53G of the final thread profile 23 or 33 or 43 or 53, respectively, each continue at the transition points P1 or P2 into the adjoining exclusively formed inner flank sections 23F and 23H or 33F and 33H or 43F and 43H or 53F and 53H, respectively, at the same slope or in a constantly differentiable manner; that is to say a linear straight overall flank 23A and 23B or 33A and 33B or 43A and 43B or 53A and 53B, respectively, of the final thread profile 23, 33, 43 or 53 is again obtained.

Furthermore, in all the embodiments according to FIGS. 1 to 8, the pressing-in volumes ΔVA and ΔVB lie between the respective inner flank sections of preliminary thread profile and thread-forming profile and, as viewed radially, between the transition points P1 and P2 and the thread root. The increase in the pressing-in volumes ΔVA and ΔVB at the flanks inward toward the thread root is determined by the angle difference α2−β2 or the inclination difference of the inner flank sections of preliminary thread and thread-forming profile.

Figure 9:
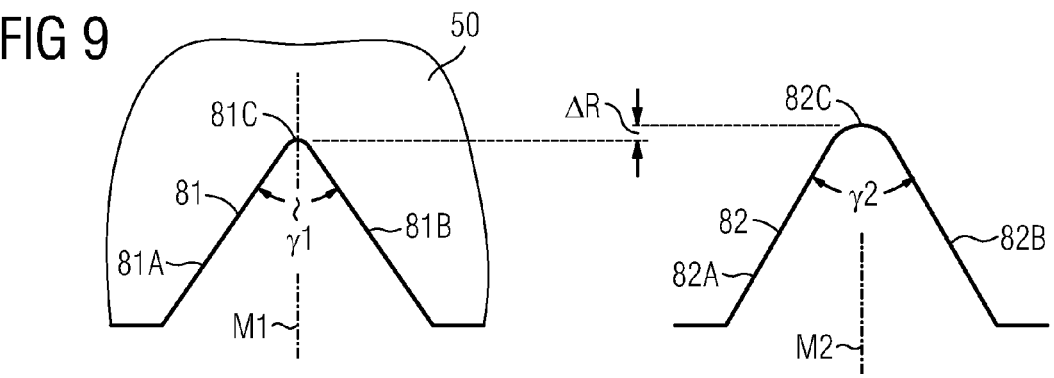
FIG. 9 shows a fifth embodiment of a cut preliminary thread profile and of a thread-reforming profile.
Figure 10:
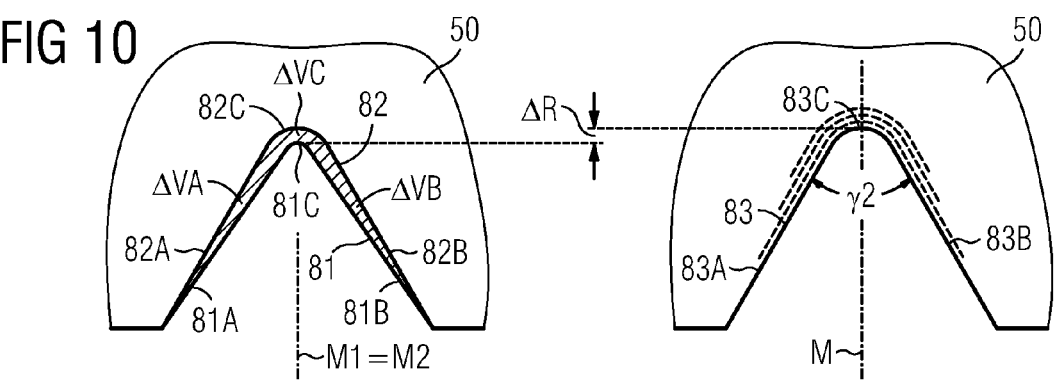
FIG. 10 shows the superimposition of the two profiles according to FIG. 9 and the final thread profile resulting therefrom.

FIGS. 9 and 10 show an exemplary embodiment in which the final thread profile is produced completely by forming or pressing-in, both at the thread root and completely at both thread flanks.

The thread root 81C of the preliminary thread profile 81 has a smaller linear extent than the thread root 82C of the thread-forming profile 82 (in longitudinal section perpendicularly to the center axes M1 and M2). The two flanks 81A and 81B of the preliminary thread profile 81 are inclined at the angle γ1 to one another and the flanks 82A and 82B of the thread-forming profile 82 are inclined at the angle γ2, which is smaller than γ1. The thread root 82C of the thread-forming profile 82 projects further outward by the radial distance ΔR.

As shown in FIG. 10, the superimposition of the two profiles 81 and 82 produces a pressing-in volume which increases in the region of the flank-side pressing-in volume ΔVA and pressing-in volume ΔVB between the flanks 81A and 82A and respectively 81B and 82B toward the thread root or inward and is essentially approximately uniformly thick there as pressing-in volume ΔVC in accordance with the radial distance ΔR. As can be seen on the right-hand side in FIG. 10, the consolidation is therefore greater toward the final thread root 83C.

Figure 11:
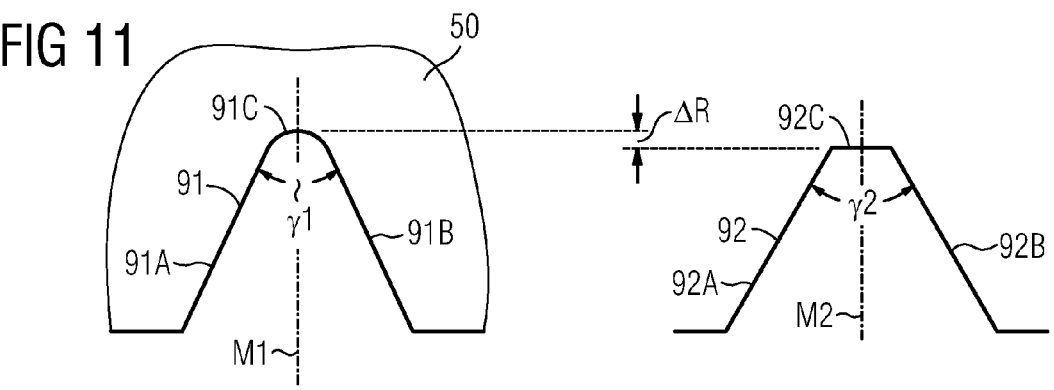
FIG. 11 shows a sixth embodiment of a cut preliminary thread profile and of a thread-reforming profile.
Figure 12:
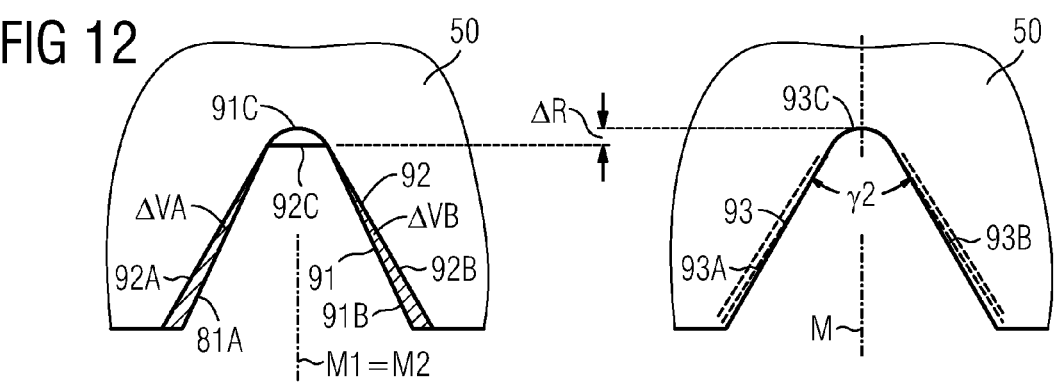
FIG. 12 shows the superimposition of the two profiles according to FIG. 11 and the final thread profile resulting therefrom.

In the embodiment according to FIGS. 11 and 12, the preliminary thread profile 91 has two straight flanks 91A and 91B, which enclose the angle γ1 with one another and are connected to one another via a rounded thread root 51C. The thread-forming profile 92 has two straight flanks 92A and 92B, which enclose an angle γ2, which is greater than the angle γ1, and are connected to one another via a straight horizontal thread root 92C (trapezoidal thread-forming profile). A special feature of the embodiment according to FIGS. 11 and 12, then, is that the radial distance of the thread root region 92C of the thread-forming profile 92 is shifted radially further inward than the thread root region 91C of the preliminary thread profile 91.

This results in a negative radial distance −ΔR, and, in the superimposition of the two profiles 91 and 92, as shown in FIG. 12, no forming takes place in the region of the thread root 91C of the preliminary thread profile 91 and in the inner regions of the flanks 91A and 91B, but rather forming takes place only in those sections of the flanks 91A and 91B of the preliminary thread 91 which run outward. This results in a pressing-in volume ΔVA of the thread-forming profile 92 between the flanks 91A and 92A and in a pressing-in volume ΔVB between the flanks 91B and 92B, said respective pressing-in volume increasing outward from the thread root 91C, the increase being determined by the angle difference γ2−γ1. In the final thread profile 93, the thread root 93C is therefore formed by the original preliminary thread and its thread root 91C, and the flanks 93A and 93B are essentially formed and are predetermined by the flanks 92A and 92B of the thread-forming profile 92.

Figure 13:
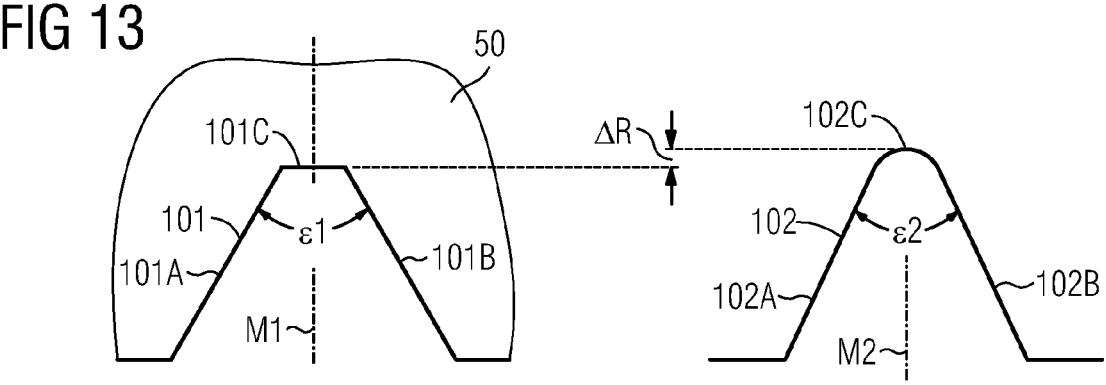
FIG. 13 shows a seventh embodiment of a cut preliminary thread profile and of a thread-reforming profile.
Figure 14:
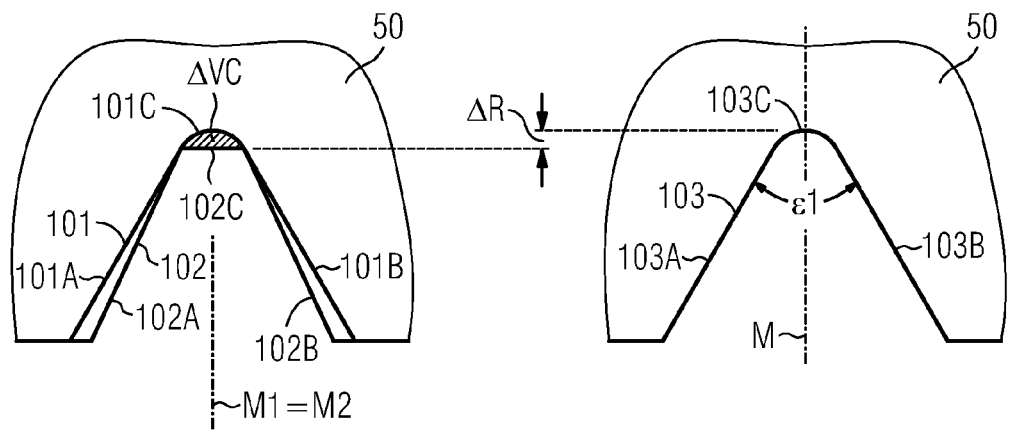
FIG. 14 shows the superimposition of the two profiles according to FIG. 13 and the final thread profile resulting therefrom.

In the embodiment according to FIGS. 13 and 14, the preliminary thread profile 101 is trapezoidal, having two straight flanks 101A and 101B, which enclose the angle ε1 relative to one another, and a flat thread root 101C. The thread-forming profile 102 has two straight flanks 102A and 102B, which enclose an angle ε2>ε1 and are connected to one another via a round thread root 102C.

In the superimposition of the two profiles 101 and 102, as shown in FIG. 14, only forming takes place in the region of the thread root 101C of the preliminary thread profile 101, that is to say a pressing-in volume ΔVC is obtained between thread roots 101C and 102C, but not at the flanks.

Figure 15:
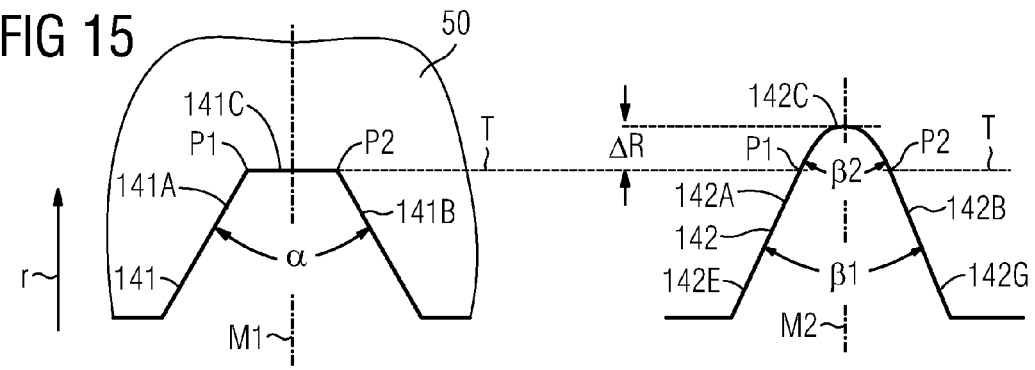
FIG. 15 shows an eighth embodiment of a cut preliminary thread profile and of a thread-reforming profile.
Figure 16:
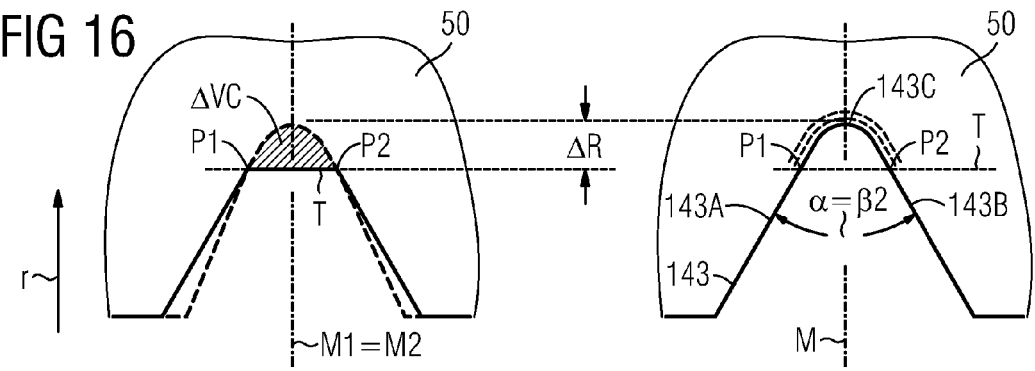
FIG. 16 shows the superimposition of the two profiles according to FIG. 15 and the final thread profile resulting therefrom.

In the embodiment according to FIGS. 15 and 16, the preliminary thread profile 141 is trapezoidal, having two straight flanks 141A and 141B, which enclose the angle α relative to one another, and a flat thread root 141C, which runs at the level of a separating line T which defines the transition points P1 and P2 between flanks 141A and 141B and thread root 141C. In contrast, the thread-forming profile 142 has two flanks 142A and 142B which are subdivided into two linear flank sections 142E and 142F and respectively 142G and 142H at the transition points P1 and P2 defined by the separating line T. The outer flank sections 142E and 142G enclose the angle β1 and the inner flank sections 142F and 142H enclose the angle β2 with one another, with β2>β1.

The superimposition of the two profiles 141 and 142 with coinciding center axes M1 and M2 and identical angles α=β2 leads according to FIG. 16 to a final thread profile 143 having continuously straight final thread flanks 143A and 143B and a final thread root 143C which is exclusively formed by the volume displacement ΔVC at the thread root 141C inside the transition points P1 and P2 and which results from the shape of the thread root 142C.

In the embodiments described hitherto, the profiles are symmetrical with respect to their center axes and their center axes have been made congruent, such that the final thread profile is also symmetrical with respect to the resulting center axis. However, it is also possible to design the profiles asymmetrically and not to make their center axes congruent and at the same time obtain symmetrical and also asymmetrical final thread profiles, as also becomes clear with reference to the following exemplary embodiments.

Figure 17:
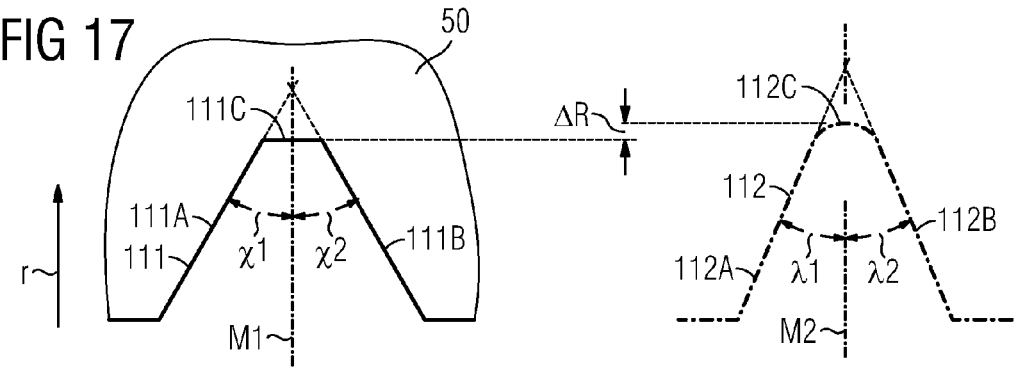
FIG. 17 shows a ninth embodiment of a cut preliminary thread profile and of a thread-reforming profile.
Figure 18:
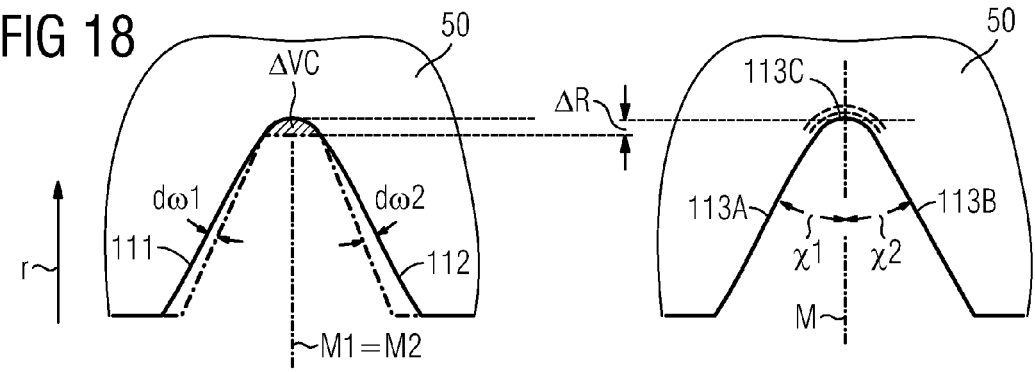
FIG. 18 shows the superimposition of the two profiles according to FIG. 17 and the final thread profile resulting therefrom.

In the embodiment according to FIGS. 17 and 18, the preliminary thread profile 111 and the thread-forming profile 112 are each designed to be asymmetrical to their center axes M1 and M2, respectively. The two linear flanks 111A and 111B of the preliminary thread profile 111 are arranged at different inclination angles κ1 and κ2 to the center axis M1 and the two linear flanks 112A and 112B of the thread-forming profile 112 are arranged at different inclination angles λ1 and λ2 to the center axis M2. Therefore κ1≠κ2 and λ1≠λ2 and in addition λ1<κ1 and λ2<κ2. The flanks 111A and 111B of the preliminary thread profile 111 therefore project laterally further outward than the flanks 112A and 112B of the thread-forming profile 112, to be precise by the differential angle dω1=κ1−λ1 and dω2=κ2−λ2, respectively. The round thread root region 112C of the thread-forming profile 112 projects radially further outward than the flattened preliminary thread root 111C by ΔR.

This results according to FIG. 18 in a pressing-in volume ΔVC during the profile superimposition with coinciding center axes M1 and M2 and in a final thread profile 113 with forming and consolidation only at the thread root 113 of the final thread profile 113 and in final thread flanks 113A and 113B which are directed at the angle κ1 and κ2, respectively, relative to the center axis M, which coincides with the center axes M1 and M2.

Figure 19:
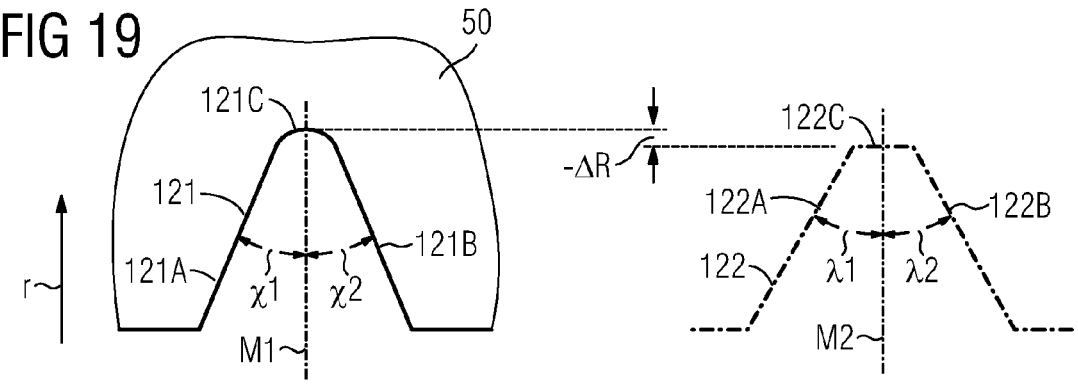
FIG. 19 shows a tenth embodiment of a cut preliminary thread profile and of a thread-reforming profile.
Figure 20:
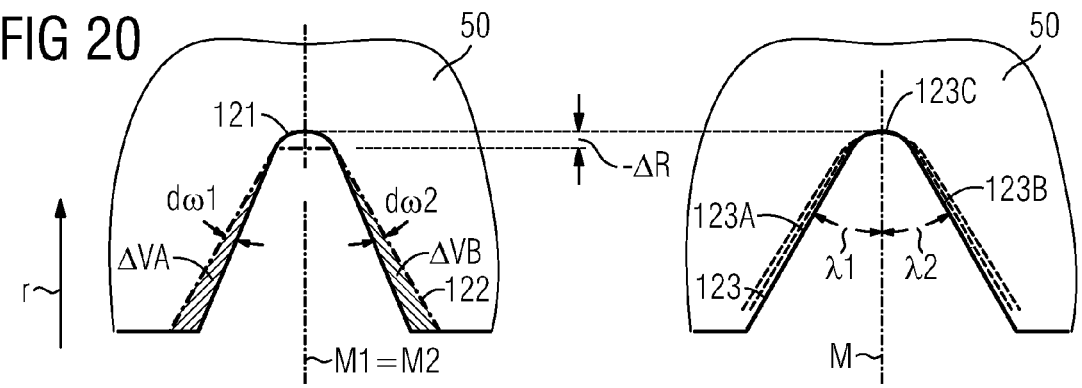
FIG. 20 shows the superimposition of the two profiles according to FIG. 19 and the final thread profile resulting therefrom.

The embodiment according to FIGS. 19 and 20 has an asymmetrical preliminary thread profile 121 having linear flanks 121A and 121B, which are inclined at different inclination angles κ1 and κ2 to the center axis M1, and a round thread root 121C. The thread-forming profile 122 is likewise designed to be asymmetrical to its center axis M2, with two linear flanks 122A and 122B having different inclination angles λ1 and λ2 to the center axis M2. Again, therefore, κ1≠κ2 and λ1≠λ2 and in addition it is now the case here that λ1>κ1 and λ2>κ2. The flanks 122A and 122B of the thread-forming profile 122 are further outward than the preliminary thread flanks 121A and 121B by the differential angle dω1=λ1−κ1 and dω2=λ2−κ2, respectively. The thread root region 122C of the thread-forming profile 122 is set back radially relative to the preliminary thread root 111C by −ΔR.

The superimposition of the profiles 121 and 122 produces, as can be seen in FIG. 20, pressing-in volumes ΔVA and ΔVB, widening outward away from the thread root by the differential angles dω1 and dω2, respectively, at the flanks, with coinciding center axes M1 and M2, and finally a final thread profile 123 with forming and consolidation only at the final thread flanks 123A and 123B, but not at the final thread root 123, which remains produced by cutting action. The final thread flanks 123A and 123B are inclined at the angle λ1 and λ2, respectively, to the center axis M.

Figure 21:
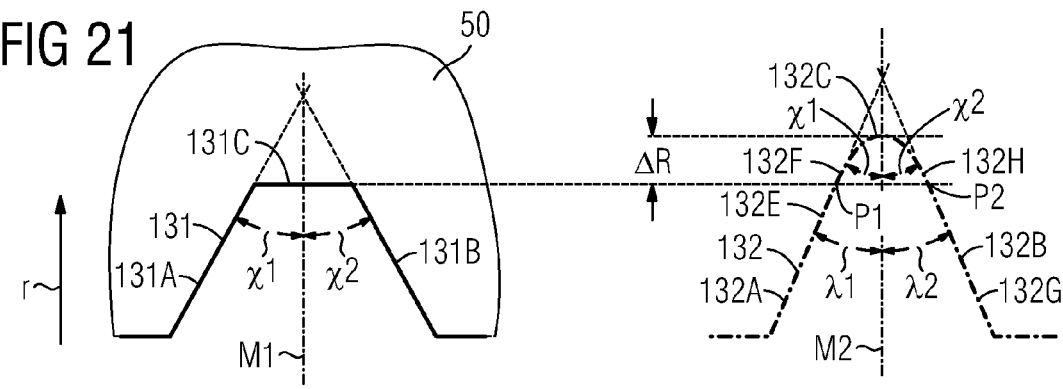
FIG. 21 shows an eleventh embodiment of a cut preliminary thread profile and of a thread-reforming profile.
Figure 22:
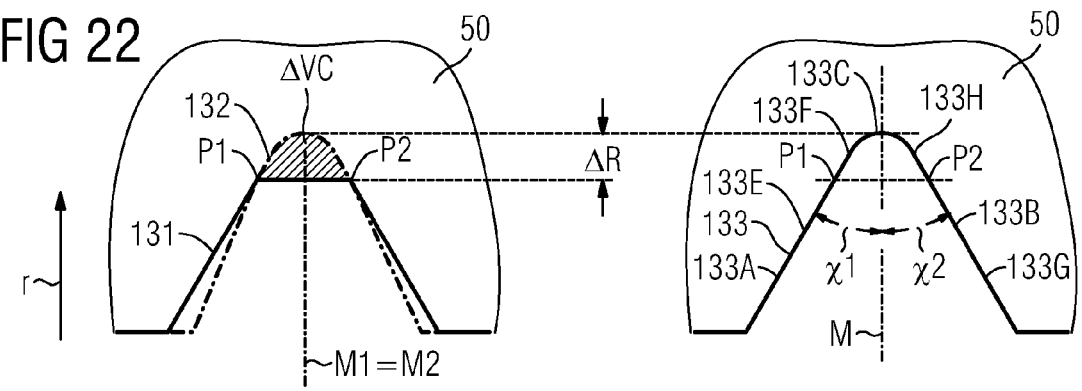
FIG. 22 shows the superimposition of the two profiles according to FIG. 21 and the final thread profile resulting therefrom.

In the embodiment according to FIGS. 21 and 22, the preliminary thread profile 131 has two linear flanks 131A and 131B, having inclination angles κ1 and κ2 to the center axis M1, where κ1≠κ2 in asymmetrical arrangement (or κ1=κ2 in symmetrical arrangement), and a flat thread root 131C. At the thread-forming profile 131, on the other hand, the flanks 132A and 132B are each subdivided into two flank sections 132E and 132F and respectively 132G and 132H having transition points P1 and P2 at the separating line T and different inclination angles λ1 and κ1 and respectively λ2 and κ2 relative to the center axis M1. In this case, λ1≠λ2 and in addition λ1<κ1 and λ2<κ2. The thread root region 132C of the thread-forming profile 132 projects radially further outward by ΔR than the preliminary thread root 131C lying on the separating line T.

According to FIG. 22, this produces, during the profile superimposition of the profiles 131 and 132 with coinciding center axes M1 and M2, a pressing-in volume ΔVC only at the preliminary thread root 131C and a final thread profile 133 at which the linear final thread flanks 133A and 133B are directed at the angle κ1 and κ2, respectively, to the center axis M, which coincides with the center axes M1 and M2. In the final thread profile 133, the inner flank sections 133F and 133H above P1 and P2 and the thread root 133C are formed and the outer flank sections 133E and 133G below P1 and P2 are produced by a cutting action.

Figure 23:
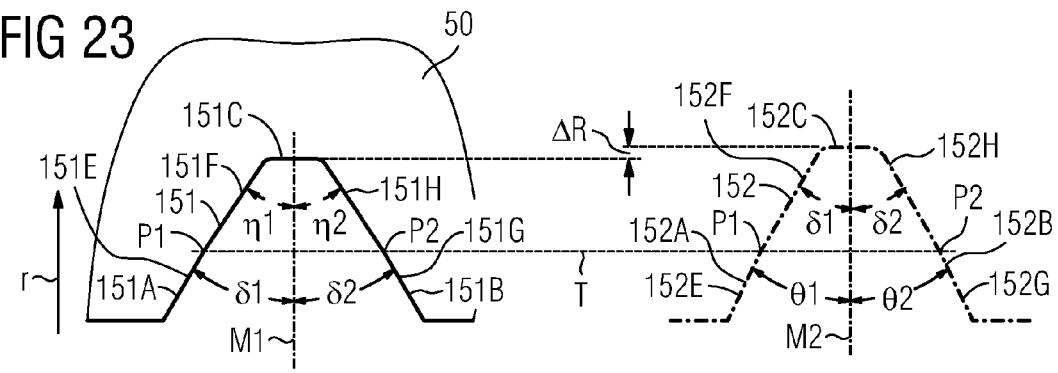
FIG. 23 shows a twelfth embodiment of a cut preliminary thread profile and of a thread-reforming profile.
Figure 24:
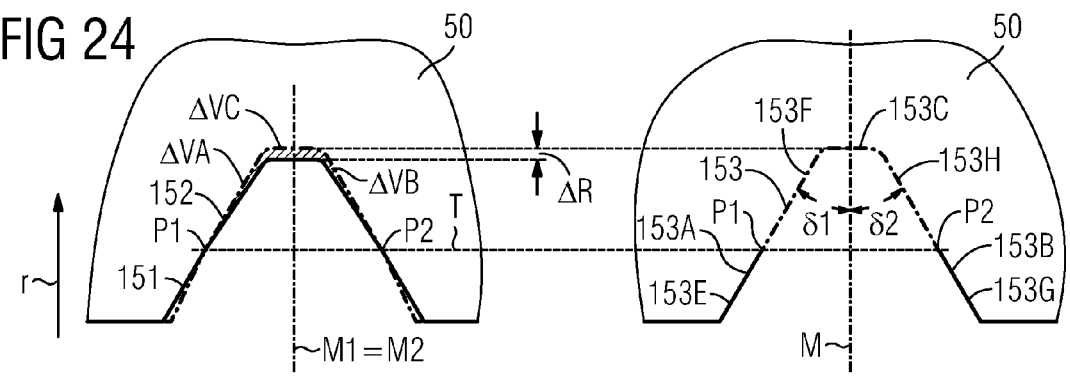
FIG. 24 shows the superimposition of the two profiles according to FIG. 23 and the final thread profile resulting therefrom.

FIGS. 23 and 24 show a preliminary thread profile 151, having preliminary thread flanks 151A and 151B, subdivided into two respective straight flank sections 151E and 151F and 151G and 151H at transition points P1 and P2 at the separating line T, and a flat thread root 151C, with or without rounded-off transition regions relative to the flanks 151A and 151B, on the one hand, and a thread-forming profile 152, likewise having flanks 152A and 152B, subdivided into two respective straight flank sections 152E and 152F and 152G and 152H at transition points P1 and P2 at the same separating line T, and a flat thread root 152C with or without rounded-off transition regions relative to the flanks 152A and 152B, said thread root 152C being offset from the preliminary thread root 151C by ΔR. At the preliminary thread profile 151, the inner flank sections 151F and 151H are inclined at the larger angles η1 and η2 and the outer flank sections 151E and 151G are inclined at the smaller angles δ1 and δ2 relative to the center axis M1. At the thread-forming profile 152, the inner flank sections 152F and 152H are inclined at the angles δ1 and δ2 and the outer flank sections 152E and 152G are inclined at the smaller angles θ1 and θ1 relative to the center axis M2.

When the two profiles 151 and 152 are superimposed, with M1=M2, according to FIG. 24, this produces an asymmetrical pressing-in volume ΔVC of constant width at the thread root and two pressing-in volumes ΔVA and ΔVB, widening inward by dω1=η1−δ1 and dω2=η2−δ2, where dω1≠dω2, at the flanks. The final thread profile 153, on the other hand, is symmetrical with respect to its center axis M and has two straight flanks 153A and 153B, of which the flank sections 153F and 153H above the points P1 and P2 are formed together with the thread root 153C and the flank sections 153E and 153G below P1 and P2 are cut.

Figure 25:
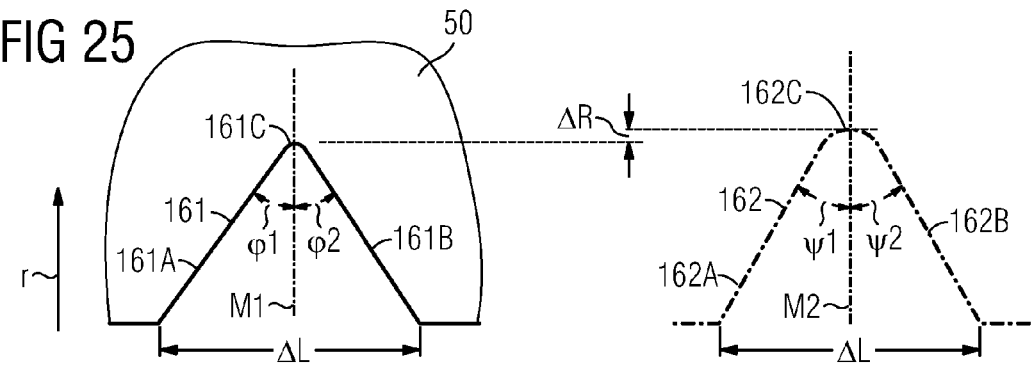
FIG. 25 shows a thirteenth embodiment of a cut preliminary thread profile and of a thread-reforming profile.
Figure 26:
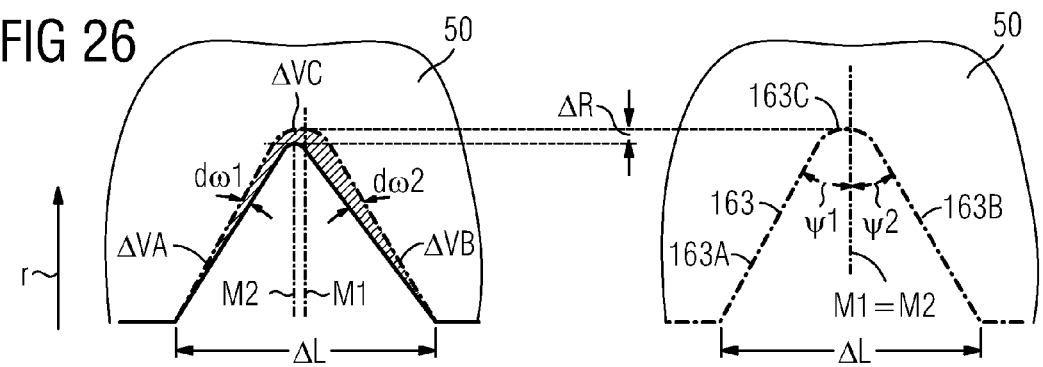
FIG. 26 shows the superimposition of the two profiles according to FIG. 25 and the final thread profile resulting therefrom.

In the embodiment according to FIGS. 25 and 26, the preliminary thread profile 161 and the thread-forming profile 162 are not made congruent when superimposed with their center axes M1 and M2, but rather are offset slightly in parallel. The straight preliminary thread flanks 161A and 161B are inclined at different angles ψ1 and ψ2 to the center axis M1 and the straight flanks 162A and 162B of the thread-forming profile 162 are inclined at angles φ1 and φ2, different from one another, to the center axis M2, where ψ1>φ1 and ψ2>φ2. The base length ΔL at the profile or tooth base is the same in both profiles 161 and 162.

It can be seen in FIG. 26 that the center axes M1 and M2 are displaced parallel to one another, to be precise preferably in such a way that the base lengths ΔL or the base points of both profiles 161 and 162 overlap exactly. With respect to the center axis M1 of the preliminary thread profile 161, this results in an asymmetrical pressing-in volume which consists of a pressing-in volume ΔVC at the thread root and two pressing-in volumes ΔVA and ΔVB, increasing toward the thread root by dω1=ψ1−φ1 and dω2=ψ2−φ2, where dω1≠dω2, at the flanks. The final thread profile 163 accordingly has two final thread flanks 163A and 163B, inclined by φ1 and φ2, respectively, to the center axis M=M2, and the thread root 163C and is (also) formed over its entire profile length. The center axes M1 and M2 and M in an asymmetrical profile, for example, may run through the radially deepest or highest point of the profile or may also be defined differently as reference axes running through the profile.

Figure 27:
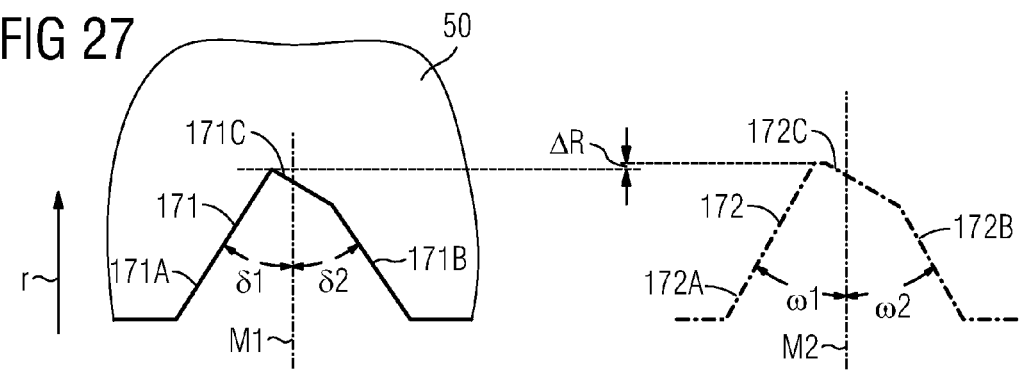
FIG. 27 shows a fourteenth embodiment of a cut preliminary thread profile and of a thread-reforming profile.
Figure 28:
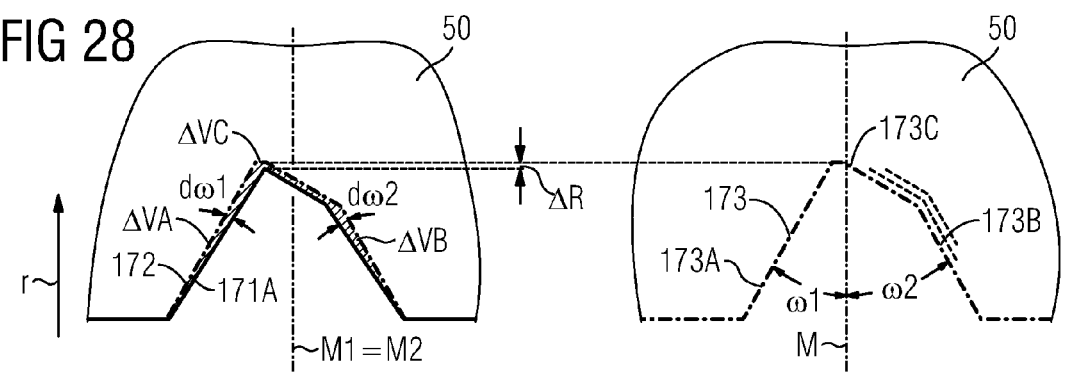
FIG. 28 shows the superimposition of the two profiles according to FIG. 27 and the final thread profile resulting therefrom.

FIGS. 27 and 28 show a special profile which has an asymmetrical form and is suitable, for example, for producing a self-locking thread according to the EMUGE manual, page 294. The final thread profile 173 has two linear flanks 173A and 173B, inclined at different angles ω1 and ω2 to the center axis M, and a thread root 173C which runs mainly obliquely and partly horizontally. To produce this final thread profile 173, a preliminary thread profile 171 is produced by a cutting action, having two linear flanks 171A and 171B, inclined at the angles ρ1 and ρ2 to the center axis M1, and a sloping linear thread root 171C (without horizontal section). The thread-forming profile 172 for the further forming of the preliminary thread profile 171 has the linear flanks 172A and 172B, already inclined at the angles ω1 and ω2 of the final thread profile 173 relative to the center axis M2, and the thread root 172C, which already corresponds to the final thread root 173C (with horizontal and sloping section) and is fed in radially further than the preliminary thread root 171C by ΔR.

The superimposition of the profiles 171 and 172, with M1=M2, produces the pressing-in volumes ΔVA and ΔVB at the flanks, said pressing-in volumes ΔVA and ΔVB widening inward by the angles dω1=ρ1−ω1 and dω2=ρ2−ω2, and the pressing-in volume ΔVC at the thread root, said pressing-in volume ΔVC having a constant width at the slopes, running parallel to one another, of the thread roots 171C and 172C. The final thread profile 173 assumes the shape of the thread-forming profile 172 and is therefore formed further over the entire profile length. The consolidation is greatest at the transition between the flank 173B and the thread root 173C, a factor which is favorable for a self-locking thread.

Figure 29:
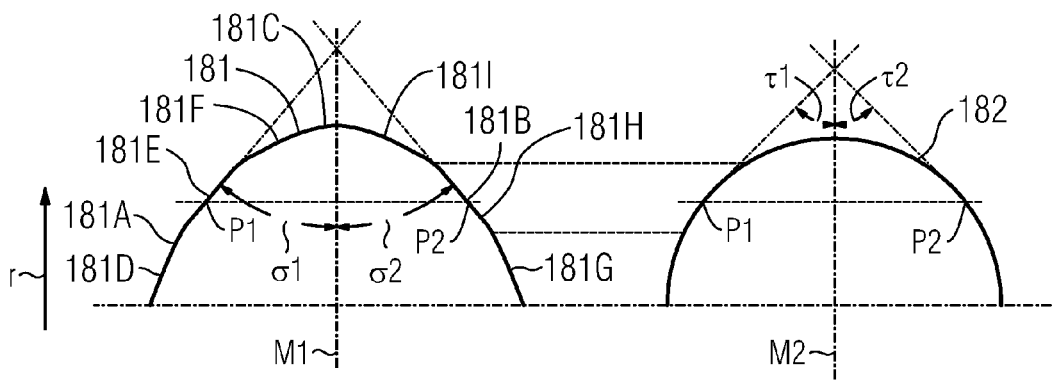
FIG. 29 shows a fifteenth embodiment of a cut preliminary thread profile and of a thread-reforming profile.
Figure 30:
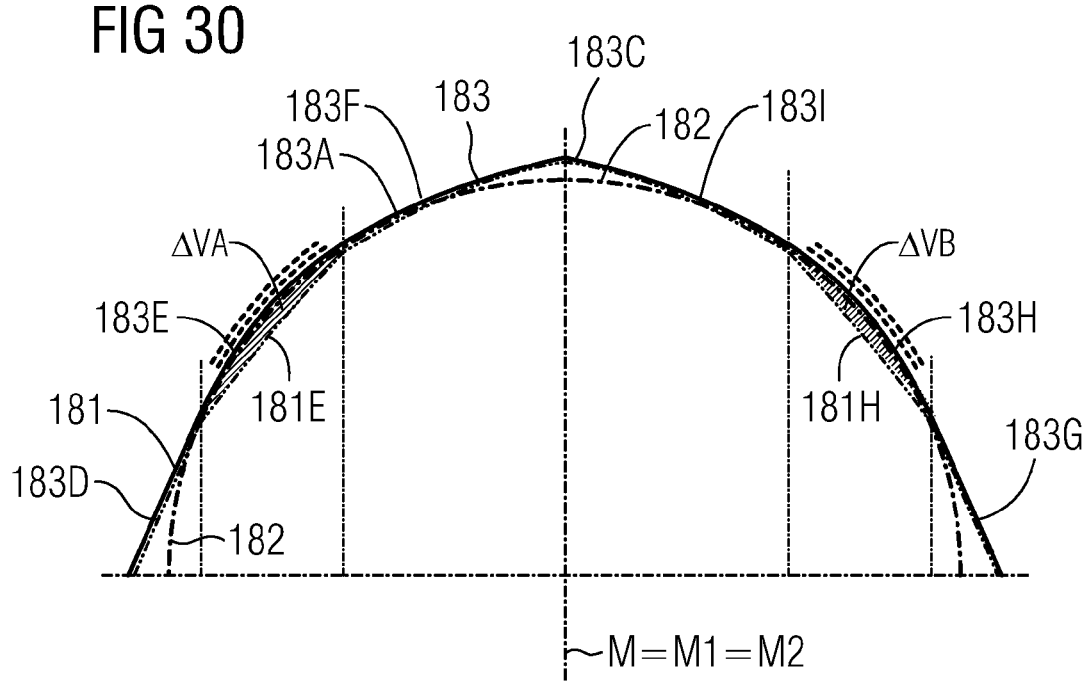
FIG. 30 shows the superimposition of the two profiles according to FIG. 29 and the final thread profile resulting therefrom.
Figure 31:
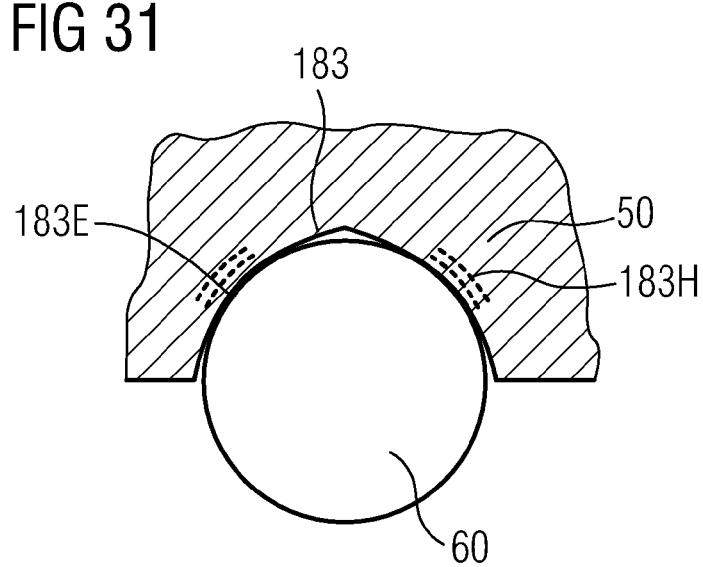
FIG. 31 shows the final thread profile according to FIG. 30 as a re-circulating ball screw thread.

FIGS. 29 to 31 show a further special profile as a final thread profile 183 superimposed from a preliminary thread profile 181 and a thread-forming profile 182, this special profile being suitable for a re-circulating ball screw thread. In such re-circulating ball screw threads, as can be seen from FIG. 31, the running surfaces for the balls 60, which correspond to the flank sections 183E and 183H of the final thread profile 183, should have as good a surface quality as possible or should be as smooth as possible for good running properties and according to the invention are therefore reworked by forming, which produces a better and smoother surface than cutting production.

The cut preliminary thread profile 181 is composed in a polygonal fashion of a plurality of straight flank sections 181D, 181E and 181F at the flank 181A and 181G, 181H and 181I at the flank 181B and of a pointed thread root 181C symmetrically to the center axis M1. However, the precut preliminary thread profile 181 may also be designed differently; e.g., it may have the same radius as the finished or final thread profile, but be stepped in diameter, or may have smaller radii than the final thread profile. The thread-forming profile 182, on the other hand, is designed in a circular manner as a semicircle having the center axis M2. The inclination angles of the flank sections 181E and 181H are designated by σ1 and σ2 and are each larger than the radial depth τ1 and τ2, which is the same as the tangent angle at the circular profile in the center or at points P1 and P2.

During the reforming of the preliminary thread profile 181 by means of the thread-forming profile 182 according to FIG. 30, wherein M=M1=M2, the workpiece 50 is therefore pressed-in only at the flank sections 183E and 183H of the final thread profile 183 by the pressing-in volumes ΔVA and ΔVB between the circular thread-forming profile 183, projecting further outward there, and the respective preliminary flank section 181E and 181G and is consolidated there, whereas apart from that it is not formed further, that is to say the final thread profile 183 is otherwise cut.

A working movement with a tool 5 designed as a thread milling cutter and having a number of thread milling teeth 6 for producing a preliminary thread according to the invention is shown in FIGS. 32 to 37. First of all the tool 5 is positioned with its tool axis A coaxially to a center axis M of a hole 55 in the workpiece 50 (FIG. 32). From this initial position, the tool 5 is now plunged with a linear feed movement axially to the tool axis A and center axis M into the hole 55 in the workpiece 50, in particular down to the thread depth (FIG. 33). With an approach radius or an approach loop, the tool 5 is now fed in radially to the inner wall of the hole 55 according to FIG. 34.

According to FIG. 35, the tool 5, with a number of revolutions of its tool axis A which result from the number of thread milling teeth 6 and the number of desired thread turns, is now moved with a circular movement about the center axis M with at the same time a feed movement parallel to the tool axis A. As a result, the tool 5 produces in the inner wall of the hole 55 an internal thread as preliminary thread 7 having a pitch which results from the feed rate and the spacing of the individual thread milling teeth 6 of the tool 5.

Figure 36:
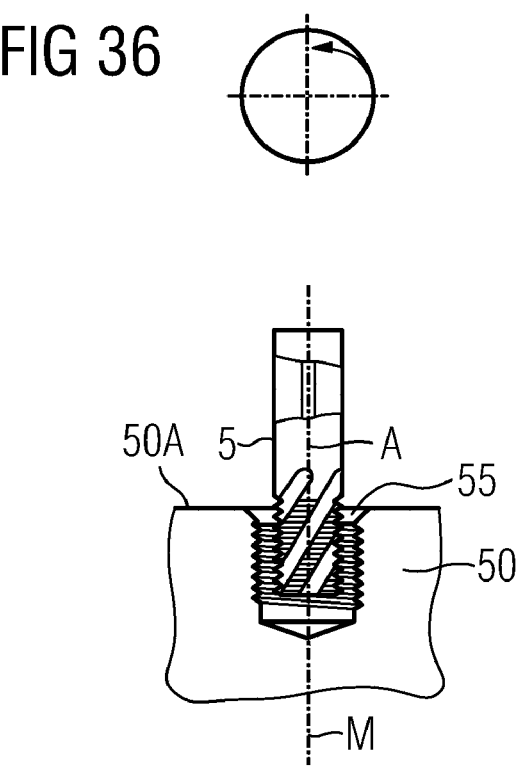
Figure 37:
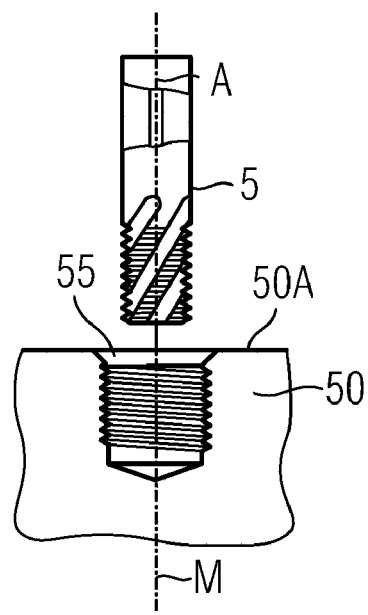

After this helical working movement according to FIG. 35, the tool 5 is now adjusted radially again relative to the center according to FIG. 36, such that the tool axis A and the center axis M are coaxial to one another again. For this retraction movement, a withdrawal radius is again provided. According to FIG. 37, with an axial return movement, the tool 5 is moved out of the hole 55 axially relative to the center axis M back into its initial position. The center axis M of the produced preliminary thread 7 in the hole 55 coincides with the center axis of the circular movement of the tool 20 during the working movement in FIG. 35.

The preliminary thread profile 21 is preferably produced by a tap or a thread milling cutter or also by a circular drill thread milling cutter.

Following this cutting production of the preliminary thread 7, in a second step the preliminary thread 7, for producing the final thread, is now shaped further by a thread-forming tool provided with the thread-forming profile as effective profile, either a thread former or a circular thread former.

Alternatively, both working steps may also be carried out using a combination tool which has, offset axially from one another relative to the tool axis, a tapping region and/or a thread milling region as cutting region and a thread-forming region and/or a circular thread-forming region as forming region, which engage in the workpiece one after the other.

The curved thread root regions are preferably curved convexly, in particular in a circular shape, or elliptically or parabolically in all the embodiments with respect to the interior space or the thread turn.

The thread-forming profile is obtained in all the embodiments as an effective profile or superimposed profile of a thread-forming process or of one or more thread-forming tools and, in a thread-forming tool having a plurality of pressing lobes or forming teeth, corresponds to the superimposition of all the individual profiles of the individual pressing lobes or forming teeth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

LIST OF DESIGNATIONS

- 5 Tool
- 6 Thread milling teeth
- 7 Preliminary thread
- 20 Tool
- 21 Preliminary thread profile
- 21A, 21B Thread flanks
- 21C Thread root
- 21E-21H Flank section
- 22 Thread-forming profile
- 22A, 22B Flanks
- 22E-22H Flank section
- 23 Final thread profile
- 23C Thread root
- 23E-23H Flank section
- 31 Preliminary thread profile
- 31A, 31B Flank
- 31C Thread root region
- 31E-31H Flank section
- 32 Thread-forming profile
- 32A, 32B Flank
- 32C Thread root region
- 32E-32H Flank section
- 33 Final thread profile
- 33A, 33B Flanks
- 33C Thread root
- 33E to 33H Flank sections
- 41 Preliminary thread profile
- 41A, 41B Flanks
- 41C Thread root
- 41E-41H Flank section
- 42 Thread-forming profile
- 42E-42H Flank section
- 43 Final thread
- 43A, 43B Flank
- 43E-43H Flank section
- 50A Workpiece surface
- 50 Workpiece
- 51 Preliminary thread profile
- 51A, 51B Flanks
- 51C Thread root region
- 51E-51H Flank section
- 52 Thread-forming profile
- 52C Thread root region
- 52E-52H Flank section
- 53 Final thread profile
- 53A, 53B Thread flanks
- 53C Thread root
- 53D-53H Flank sections
- 55 Hole
- 60 Balls
- 81 Preliminary thread profile
- 81A, 81B Flanks
- 81C Thread root 82 Thread-forming profile
82A, 82B Flanks
82C Thread root
91 Preliminary thread profile
91A, 91B Flanks
91C Thread root
92 Thread-forming profile
92A, 92B Flanks
92C Thread root
93 Final thread profile
93A, 93B Flanks
93C Thread root
101 Preliminary thread profile
101A, 101B Flanks
102 Thread-forming profile
102A, 102B Flanks
102C Thread root
111 Preliminary thread profile
111A, 111B Flanks
111C Preliminary thread root
112 Thread-forming profile
112A, 112B Flanks
112C Thread root region
113 Final thread profile
113A, 113B Final thread flanks
113C Thread root
121 Preliminary thread profile
121A, 121B Flanks
121C Thread root
122 Thread-forming profile
122A, 122B Flanks
123 Final thread profile
123A, 123B Final thread flanks
123C Final thread root
131 Preliminary thread profile
131A, 131B Flanks
131C Preliminary thread root
132 Thread-forming profile
132A, 132B Flanks
132C Thread root region
132E . . . 132H Flank section
133 Final thread profile
133A, 133B Flank
133F . . . 133H Flank section
141 Preliminary thread profile
141A, 141B Flanks
141C Thread root
142 Thread-forming profile
142A, 142B Flanks
142C Thread root
142E . . . 142H Flank section
143 Final thread profile
143A, 143B Final thread flanks
143C Final thread root
151 Preliminary thread profile
151A, 151B Flanks
151C Preliminary thread root
151E . . . 151H Flank section
152 Thread-forming profile
152A, 152B Flanks
152C Thread root
152E . . . 152H Flank section
153 Final thread profile
153A, 153B Flanks
153C Thread root
153E . . . 153H Flank section
161 Preliminary thread profile
161A, 161B Preliminary thread flanks
162 Thread-forming profile
162A, 162B Flanks
163 Final thread profile
163A, 163B Final thread flanks
163C Thread root
171 Preliminary thread profile
171A, 171B Flanks
171C Thread root
172 Thread-forming profile
172A, 172B Flanks
172C Thread root
173 Final thread profile
173A, 173B Flanks
173C Thread root
181 Preliminary thread profile
181A, 181B Flanks
181C Thread root
181D . . . 181H Flank sections
182 Thread-forming profile
183 Final thread profile
183D . . . 183H Flank sections
A Tool axis
M, M1, M2 Center axis
P1, P2 Transition points
r Radius
T Separating line
$\alpha1, \alpha2, \beta1, \beta2$ Angle
$\gamma1, \gamma2, \delta1, \delta2$ Angle
$\epsilon1, \epsilon2, \kappa1, \kappa2$ Angle
$\lambda1, \lambda2, \phi1, \phi2$ Angle
$\tau1, \tau2, d\omega1, d\omega2$ Angle
$\theta1, \theta2, \sigma1, \sigma2$ Angle
$\omega1, \omega2, \rho1, \rho2$ Angle
$\Delta R$ Radial distance
$\Delta VA, \Delta VB, \Delta VC$ Pressing-in volume

We claim:

1. A method for producing a thread in a workpiece, comprising the steps:

a) producing a preliminary thread in the workpiece in at least one first working step by removing material from the workpiece with a cutting action, wherein a preliminary thread profile is produced having two preliminary thread flanks and a preliminary thread root connecting the two preliminary thread flanks; and b) producing a final thread having a final thread profile, the final thread profile having two final thread flanks and a final thread root connecting the two final thread flanks, wherein the final thread is produced in at least one second working step by plastic pressing-in of the material of the workpiece at least in a section of the preliminary thread profile by a predetermined pressing-in volume using at least one thread-forming profile, the at least one thread-forming profile having two flanks and a root region connecting the two flanks;

c) wherein at least one of the preliminary thread flanks is inclined at least in a flank section at a first inclination angle to a center axis of the preliminary thread profile, and wherein at least one of the flanks of the thread-forming profile is inclined at least in a flank section at a second inclination angle to a center axis of the thread-forming profile;

d) wherein the first inclination angle and the second inclination angle are different from one another.

2. A tool set configured for carrying out a method as claimed in claim 1.

3. The method as claimed in claim 2, wherein the material of the workpiece is pressed in at least in the flank section of the preliminary thread profile that is inclined at the first inclination angle to the center axis using at least the flank section of the thread-forming profile that is inclined at the second inclination angle to the center axis.

4. The method as claimed in claim 2, wherein:
  a second flank of the preliminary thread flanks is inclined at least in a flank section at a third inclination angle to the center axis;
  a second flank of the thread-forming profile is inclined at least in a flank section at a fourth inclination angle to the center axis; and
  the third inclination angle and the fourth inclination angle are different from one another.

5. The method as claimed in claim 4, wherein at least one of:
  the third inclination angle is equal to the first inclination angle; or
  the fourth inclination angle is equal to the second inclination angle.

6. The method as claimed in claim 4, wherein:
  the third inclination angle is different from the first inclination angle; or
  the fourth inclination angle is different from the second inclination angle.

7. The method as claimed in claim 2, wherein at least one of the following is configured to be linear or straight:
  at least one preliminary thread flank;
  at least one flank of the thread-forming profile;
  at least one final thread flank.

8. The method as claimed in claim 2, wherein:
  at least one of the following is configured to be partly curved, including being convexly curved:
    at least one preliminary thread flank;
    at least one flank of the thread-forming profile; or
    at least one final thread flank; and
  an angle of inclination at a curved flank section is defined as an angle between a tangent and the center axis.

9. The method as claimed in claim 2, wherein each center axis is directed perpendicularly to a thread center axis of the final thread.

10. The method as claimed in claim 2, further comprising at least one of:
  a) in the second working step, pressing-in the material of the workpiece over at least a section of at least one of the two preliminary thread flanks or over essentially the entire at least one preliminary thread flank; or
  b) forming at least one of or both of the final thread flanks at least in part by plastic pressing-in in the second working step.

11. The method as claimed in claim 2, further comprising at least one of:
  a) in the second working step, pressing-in the material of the workpiece essentially only in the region of the preliminary thread root; or
  b) forming the final thread root by plastic pressing-in in the second working step.

12. The method as claimed in claim 2, wherein at least one of the following comprises at least two respective flank sections directed at different inclination angles relative to the center axis:
  at least one preliminary thread flank; or
  at least one flank of the thread-forming profile.

13. The method as claimed in claim 2, further comprising at least one of:
  a) in the second working step, pressing-in the material of the workpiece in at least a first section of the flank sections that are inclined differently from each other, wherein the at least one preliminary thread flank remains essentially unchanged in at least a second flank section adjoining this first flank section;
  b) forming the at least one final thread flanks in at least a first flank section by plastic pressing-in in the second working step, wherein at least one final thread flank is produced in a second flank section adjoining the first flank section solely by the material removal in the first working step; or
  c) in the second working step, producing a final thread having a final thread profile, wherein at least one of the final thread flanks comprise an outer flank section of the preliminary thread profile and an inner flank section of one of:
    the thread-forming profile; or
    the preliminary thread profile.

14. The method as claimed in claim 13, wherein, at one or both of the preliminary thread profile or the thread-forming profile, the flank sections of the at least one flanks are each produced in a linear manner.

15. The method as claimed in claim 13, wherein the inclination angle of the outer flank sections of the preliminary thread profile is equal to the inclination angle of the inner flank sections of the thread-forming profile.

16. The method as claimed in claim 13, wherein at least one of:
  transition points at which two flank sections of a flank merge into one another at the preliminary thread profile and thread-forming profile, essentially coincide, or lie, at the same distance from a center axis of the thread in the second working step; or
  the transition points between the flank sections of preliminary thread profile and thread-forming profile are adapted to one another in such a way that each final thread flank of the final thread profile comprises a respective outer flank section of the preliminary thread profile and an inner flank section of the thread-forming profile.

17. The method as claimed in claim 2, further comprising, in the second working step, making congruent the center axes of the preliminary thread profile and the thread-forming profile.

18. The method as claimed in claim 2, further comprising, in the second working step, arranging the center axes of the preliminary thread profile and the thread-forming profile in an offset, parallel relation to one another.

19. A tool set of one or more tools for producing threads in workpieces, comprising:
  a) at least one thread-cutting region having a thread-cutting profile for producing a preliminary thread having a preliminary thread profile with two preliminary thread flanks and a preliminary thread root connecting the two preliminary thread flanks; and
  b) at least one chipless thread-forming region having a thread-forming profile, wherein the thread-forming profile has two flanks and a thread root region connecting the two flanks, the thread-forming profile being configured for reforming the preliminary thread by plastic pressing-in of the material of the workpiece at least in a section of the preliminary thread flanks by a predetermined pressing-in volume;

c) wherein the at least one thread-cutting region and the at least one chipless thread-forming region are each formed on one of an associated tool or a common tool;

d) wherein at least one of the preliminary thread flanks is inclined, at least in a flank section, at a first inclination angle to the center axis, and wherein at least one of the flanks of the thread-forming profile is inclined, at least in a flank section, at a second inclination angle to a center axis, and e) wherein the first inclination angle and the second inclination angle are different from one another.

* * * * *